US008816204B2

(12) United States Patent
Takayama et al.

(10) Patent No.: US 8,816,204 B2
(45) Date of Patent: Aug. 26, 2014

(54) WIRE CONNECTING METHOD AND WIRING HARNESS

(75) Inventors: Tsutomu Takayama, Makinohara (JP); Hiroshi Kobayashi, Toyota (JP); Saori Muramatsu, Toyota (JP); Shinya Kai, Toyota (JP); Takahito Nakajima, Toyota (JP)

(73) Assignee: Yazaki Corporation, Tokyo (JP)

( * ) Notice: Subject to any disclaimer, the term of this patent is extended or adjusted under 35 U.S.C. 154(b) by 186 days.

(21) Appl. No.: 13/639,709

(22) PCT Filed: Apr. 8, 2011

(86) PCT No.: PCT/JP2011/058922

§ 371 (c)(1), (2), (4) Date: Oct. 5, 2012

(87) PCT Pub. No.: WO2011/126115

PCT Pub. Date: Oct. 13, 2011

(65) Prior Publication Data

US 2013/0025935 A1 Jan. 31, 2013

(30) Foreign Application Priority Data

Apr. 9, 2010 (JP) ................................ 2010-090524

(51) Int. Cl.

| | |
|---|---|
| ***H02G 15/02*** | (2006.01) |
| ***H01R 4/18*** | (2006.01) |
| ***H01R 4/20*** | (2006.01) |
| ***H01R 43/02*** | (2006.01) |
| *H01R 4/24* | (2006.01) |

(52) U.S. Cl.

CPC .................. *H01R 4/184* (2013.01); *H01R 4/20* (2013.01); *H01R 4/2495* (2013.01); *H01R 43/0207* (2013.01)

USPC ....................................... 174/84 R; 174/84 C

(58) Field of Classification Search

CPC ........... H01R 4/00; H01R 4/02; H01R 4/021; H01R 4/023; H01R 4/026; H01R 4/029; H01R 4/10; H01R 4/18; H01R 4/184–4/186; H01R 4/20; H01R 4/206; H01R 4/2495; H02G 15/00; H02G 15/02; H02G 15/22; H02G 15/23

USPC .. 174/74 R, 84 R, 84 C, 94 R, 78, 88 R, 88 C

See application file for complete search history.

(56) References Cited

U.S. PATENT DOCUMENTS 4,208,788 A * 6/1980 Siden .............................. 29/862
6,125,533 A * 10/2000 Warner et al. .................. 29/868

(Continued)

FOREIGN PATENT DOCUMENTS

JP 54-155490 A 12/1979
JP 03-064872 A 3/1991

(Continued)

OTHER PUBLICATIONS

International Search Report for PCT/JP2011/058922 dated May 17, 2011.

*Primary Examiner* — William H Mayo, III

(74) *Attorney, Agent, or Firm* — Sughrue Mion, PLLC

(57) ABSTRACT

A wire connecting method and a wiring harness that allows one to utilize a single terminal for multiple core wires having various diameters thereby reducing the number and different types of terminals. The wire connecting method allows the larger wire cores first to be ultrasonic pressed such that the diameter of the larger core wires are reduced to sizes that are small enough to utilize the single terminal used on smaller core wires.

4 Claims, 6 Drawing Sheets

(56) References Cited

U.S. PATENT DOCUMENTS

| | | | | |
|---|---|---|---|---|
| 6,671,952 | B2 * | 1/2004 | Ono | 29/860 |
| 6,747,211 | B2 * | 6/2004 | Connor et al. | 174/84 R |
| 8,258,402 | B2 * | 9/2012 | Hagi et al. | 174/84 R |
| 2009/0314511 | A1 * | 12/2009 | Hagi et al. | 174/78 |

FOREIGN PATENT DOCUMENTS

| | | |
|---|---|---|
| JP | 2007-305355 A | 11/2007 |
| JP | 2009-231079 A | 10/2009 |

* cited by examiner

WIRE CONNECTING METHOD AND WIRING HARNESS

CROSS REFERENCE TO RELATED APPLICATIONS

This application is a National Stage of International Application No. PCT/JP2011/058922filed Apr. 8, 2011, claiming priority based on Japanese Patent Application No. 2010-090524filed Apr. 9, 2010, the contents of all of which are incorporated herein by reference in their entirety.

TECHNICAL FIELD

This invention relates to a wire connecting method and a wiring harness, in particular, to a wire connecting method for connecting terminals with a plurality of types of covered wire having core wire sizes different from each other, and to a wiring harness having a plurality of types of covered wire having core wire sizes different from each other, and terminals connected to the covered wires.

BACK GROUND ART

Various electronic devices are mounted on a vehicle as a moving body. A wiring harness is routed in the vehicle for supplying electric power from a power source such as a battery and a control signal from a controller to the electronic devices. The wiring harness includes: a plurality of covered wires; and terminals connected to ends of the covered wires.

As an example of a connecting method for connecting terminals with the ends of the covered wires, for example, a method using pressure bonding shown in FIG. 5 is known (for example, PLT1, PLT2). As shown in FIG. 5, a covered wire 100 includes: a core wire 101 made by braiding a plurality of conductive element wires; and an insulating cover 102 covering the core wire 101. The cover 102 is removed at an end of the covered wire 100 and the core wire 101 is exposed.

A terminal 200 is provided with a not-shown electric contact portion attached to a metallic panel of a vehicle body and connected to a mating terminal, and a wire barrel 201 for pressure-bonding the core wire 101, arranged in a row in a longitudinal direction of the terminal 200. The wire barrel 201 is composed of a bottom wall portion 201A and a pair of crimping pieces 201B extended vertically from both edges in a width direction of the bottom wall portion 201A, and formed in a U-shape.

As shown in FIGS. 6B and 6C, when the core wire 101 exposed at the end of the covered wire 100 is mounted on a bottom wall 201A of the pair of crimping pieces 201B of the wire barrel 201, and the pair of crimping pieces 201B is bent inward to crimp the core wire 101, the terminal 200 is pressure-bonded to the core wire 101. Incidentally, in a lower part of FIG. 6, the core wire 10 is omitted.

However, in the wire barrel 201, there is a problem that a range of a size of the core wire 101 allowed to be pressure-bonded is small. When explaining in detail, as shown in FIG. 6A, when a core wire size is too small with respect to a barrel length L, ends of the crimping pieces 201B abut on the bottom wall 201A, and the terminal 200 and the core wire 101 of the covered wire 100 are not successfully electrically connected to each other.

Further, as shown in FIG. 6D, when the core wire size is too large with respect to the barrel length L, the ends of the crimping pieces 201B are separated from each other, and the core wire 101 is unraveled from a gap therebetween, and the terminal 200 and the core wire 101 of the covered wire 100 are not successfully electrically connected to each other.

Therefore, conventionally, as shown in FIG. 7, when the terminal 200 is connected to a plurality of types of covered wires 100 having different core wire sizes, a large terminal 200A and a small terminal 200B having different barrel lengths are prepared. The large terminal 200A is connected to the covered wire 100 having a large core wire size, and the small terminal 200B is connected to the core wire 101 having a small core wire size. As a result, it is necessary to prepare a plurality of terminals 200 having different sizes corresponding to the core wire sizes, and cost may be improved.

Further, as a connection method for connecting the terminal 200 to the end of the covered wire 100, a method in which a tubular crimping portion is provided by connecting ends of the pair of crimping pieces 201B of the wire barrel 201 to each other, and the core wire 101 exposed at the end of the covered wire 100 is inserted into the tubular crimping portion and crimped, a method in which a bottom wall and a pair of press-connecting blades extended vertically from the bottom wall are provided, and the core wire 101 is inserted into the pair of press-connecting blades and press-connected and the like are also possible (PTL 3). In any case similarly, the terminals 200 having a plurality of sizes corresponding to the core wire sizes are needed, and there is a cost problem.

CITATION LIST

Patent Literature

[PTL 1]
JP, A, 2009-231079
[PTL 2]
JP, A, 2006-108051
[PTL 3]
JP, A, H05-159628

SUMMARY OF INVENTION

Technical Problem

Accordingly, an object of the present invention is to provide a wire connecting method and a wiring harness allowed to reduce the number of types of terminals for reducing cost by increasing the number of core wire sizes able to be crimped or press-connected with respect to one terminal.

Solution to Problem

For attaining the object, according to the invention claimed in claim 1, there is provided a wire connecting method for crimping or press-connecting respectively a first covered wire having a core wire size within a specific range and a second covered wire having a core wire size larger than the specific range with a terminal having a bottom wall and a pair of pieces extended vertically from the bottom wall having sizes able to be crimped or press-connected to a core wire within the specific range size comprising the steps of:

performing an ultrasonic processing in which while a pressure is applied to the core wire of the second covered wire, ultrasonic energy is applied to the core wire to reduce the core wire size within the specific range; and mounting the core wire of the second covered wire of which core wire size is reduced within the specific range by the ultrasonic processing on the bottom wall between the pair of pieces of the terminal, and crimping or press-connecting the core wire between the pair of pieces.

According to the invention claimed in claim 2, there is provided the wire connecting method as claimed in claim 1, further comprising the step of:

mounting the core wire of the first covered wire on the bottom wall between the pair of pieces of the terminal without the ultrasonic processing, and crimping or press-connecting the core wire between the pair of pieces.

According to the invention claimed in claim 3, there is provided a wiring harness comprising:

a first covered wire having a core wire size within a specific range;

a second covered wire having a core wire size larger than the specific range; and a plurality of terminals each composed of a bottom wall and a pair of pieces extended vertically from the bottom wall, and respectively crimped or press-connected to the first and second covered wires, wherein the sizes of the bottom wall and the pair of pieces of each terminal is able to be crimped or press-connected to the core wire within the specific range, and wherein the core wire of the second covered wire is performed an ultrasonic processing in which while a pressure is applied to the core wire, ultrasonic energy is applied to the core wire to reduce the core wire size within the specific range, and crimped or press-connected between the pair of pieces of the terminal.

According to the invention claimed in claim 2, there is provided the wiring harness as claimed in claim 3, wherein the core wire of the first covered wire is crimped or press-connected between the pair of pieces of the terminal without the ultrasonic processing.

Advantageous Effects of Invention

As explained above, according to the inventions claimed in claims 1 to 4, the core wire size of the second covered wire is reduced by the ultrasonic processing, and the core wire of the second covered wire is crimped or press-connected to the terminal. Therefore, the core wire of the second covered wire having the core wire size larger than the specific range can be connected to the terminal able to be crimped or press-connected to the core wire within the specific range size. Accordingly, the number of the core wire sizes able to be crimped or press-connected to one terminal is increased, thereby cost can be reduced by reducing the number of types of the terminals.

DESCRIPTION OF EMBODIMENTS

Figure 1:
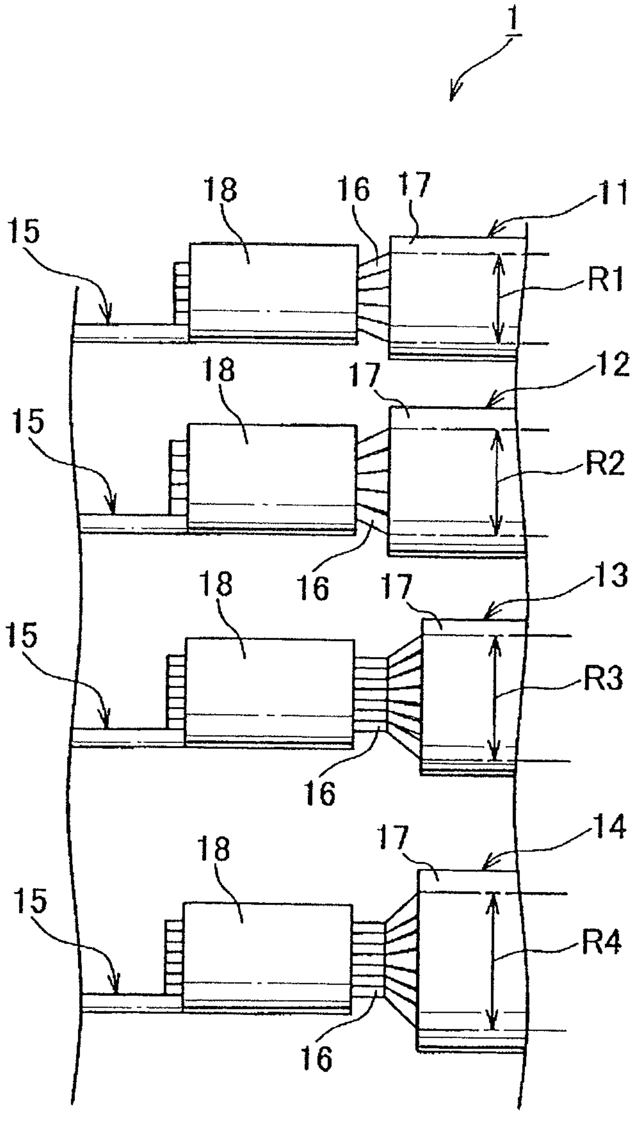
FIG. 1 is a side view showing an embodiment of a wiring harness according to the present invention.

Hereinafter, a wire connecting method and a wiring harness according to the present invention will be explained with reference to FIGS. 1 to 3. As shown in FIG. 1, a wiring harness 1 includes: a plurality of types of covered wires 11 to 14 having different core wire diameters (core wire sizes) R1 to R4; and a plurality of terminals 15 connected to these covered wires 11 to 14. Each of the covered wires 11 to 14 includes: a core wire 16 made of braided conductive element wires; and an insulating cover 17 covering the core wire 16. Incidentally, the core wire diameters R1 to R4 of the covered wires 11 to 14 are provided bigger in order of the covered wire 11, the covered wire 12, the covered wire 13, and the covered wire 14 (namely, $R1<R2<R3<R4$).

The terminals 15 are formed in the same shape and in the same size. The terminal 15 is provided with a not-shown electric contact portion attached to a metallic panel of a vehicle body, or connected to a mating terminal, and a wire barrel 18 for crimping the core wire 16 of the covered wires 11 to 14 arranged in a row in a longitudinal direction of the terminal 15. As shown in FIG. 2, the wire barrel 18 is composed of a bottom wall 18A and a pair of crimping pieces 18B extended vertically from both edges in a width direction of the bottom wall 18A, and formed in a U-shape.

The wire barrel 18 of the terminal 15 has a barrel length L able to crimp the core wire 16 having a core wire diameter within a specific range including the core wire diameters R1 and R2, and unable to crimp the core wire 16 having a core wire diameter R3 or R4 larger than the specific range because the electric connection with the core wire 16 is not good as explained in the background art. As is clear from the above, the covered wires 11, 12 having the core wire diameters R1, R2 correspond to the first covered wire in claims, and the covered wires 13, 14 having the core wire diameters R3, R4 correspond to the second covered wire in claims.

Next, a procedure for connecting the terminals 15 having the same shape and the same size with a plurality of types of covered wires 11 to 14 having different core wire diameters will be explained. First, the covers 17 at ends of the covered wires 11 to 14 are removed to expose the core wires 17.

As described above, the core wire diameters of the covered wires 13, 14 are large in comparison with the barrel length L of the terminal 15, and if directly crimping to the terminal 5, the covered wires 13, 14 are not successfully electrically connected to the terminal 15. So, as shown in FIGS. 2(C) and 2(D), an ultrasonic processing in which while the pressure is applied to the core wire 16, ultrasonic energy is applied to the core wire 16 is performed to the covered wires 13, 14. to reduce the core wire diameter within the specific range, and then the core wire 16 is crimped to the wire barrel 18 of the terminal 15. As shown in the middle parts of FIGS. 2(C) and 2(D), the core wires 16 of the covered wires 13, 14 are made smaller so that the core wire diameters thereof are substantially equal to a core wire diameter R1 of the covered wire 11.

Figure 3:
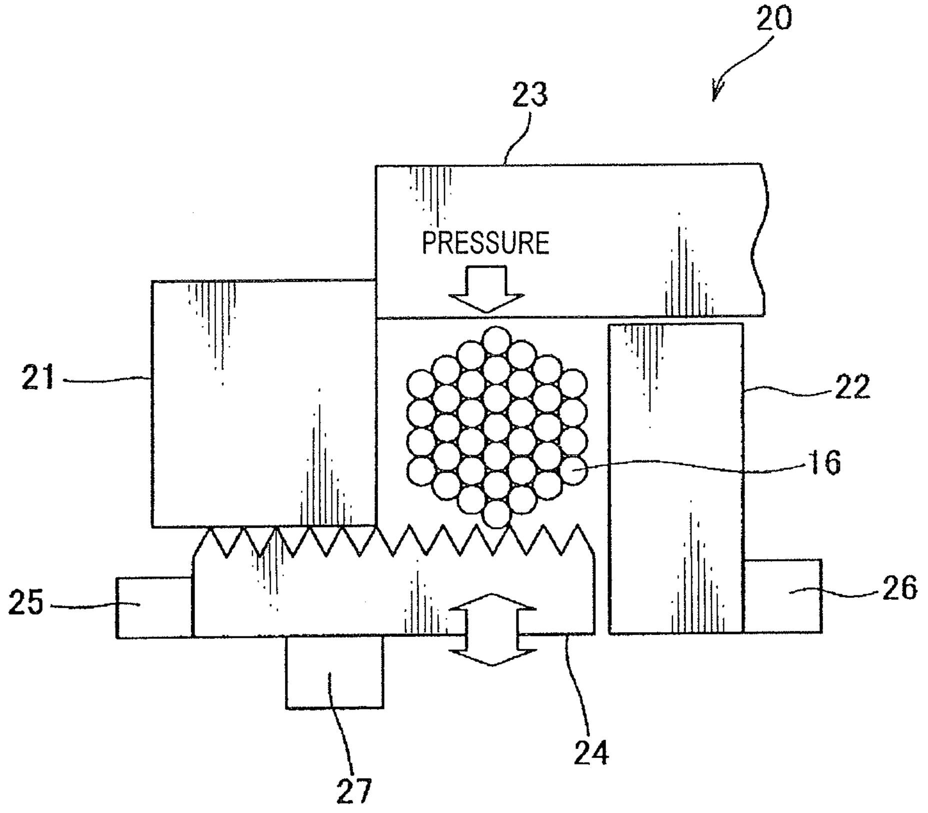
FIG. 3 is a schematic view showing an example of an ultrasonic processing device for a core wire of the covered wire shown in FIG. 2.

The above ultrasonic processing is performed by using an ultrasonic processing device 20 shown in FIG. 3. As shown in FIG. 3, the ultrasonic processing device 20 includes: a pair of box-shaped molds 21, 22 for pinching the core wire 16 exposed by removing the cover 17 at the end of the covered wire 13, 14 in a horizontal direction; and an anvil 23 and a horn 24 for pinching the core wire 16 in a vertical direction.

The mold 21 is provided movably in the horizontal direction along an upper face of the horn 24. The mold 22 is provided movably in the vertical direction along a right side face of the horn 24. The anvil 23 is mounted on an upper face of the mold 22, and provided movably in the vertical direction along a right side face of the mold 21. The horn 24 is fixed, and a concave-convex groove is formed on an upper face of the horn 24 along a longitudinal direction of the horn 24.

The ultrasonic processing device 20 further includes: fixing members 25, 26 for pinching the mold 22 and the horn 24 in the horizontal direction to prevent the mold 22 and the horn 24 from moving in the horizontal direction; and a fixing member 27 abutting on a lower face of the horn 24 to prevent the horn 24 from moving in the vertical direction. A not-shown piezoelectric oscillator is attached to the horn 24. An ultrasonic oscillation of the not-shown piezoelectric oscillator oscillates the horn 24 in the vertical direction.

Next, a procedure of the ultrasonic processing using the above-described ultrasonic processing device 20 will be explained. First, in the ultrasonic processing device 20, the mold 21 is moved in the horizontal direction to adjust a width between the molds 21, 22 to, for example, R1. Then, as shown in FIG. 3, the core wire 16 of the covered wire 13, 14 is positioned between the molds 21, 22 and between the anvil 23 and the horn 24. Then, the anvil 23 is moved downward to pinch the core wire 16 with the anvil 23 and the horn 24. Then, while the pressure is applied to the core wire 16, the not-shown piezoelectric oscillator is oscillated. Owing to the ultrasonic oscillation of the not-shown piezoelectric oscillator, the horn 24 is oscillated and the ultrasonic energy is applied to the core wire 16. Then, the anvil 23 is further moved downward until a distance between the anvil 23 and the horn 24 becomes, for example, R1.

In this way, while the pressure is applied to the core wire 16 in the vertical direction by the anvil 23 and the horn 24, the ultrasonic energy is applied to the core wire 16. Owing to this pressure, the core wire 16 is expanded in the horizontal direction, and contracted in the vertical direction. As a result of the expansion of the core wire 16 in the horizontal direction, the core wire 16 abuts on the molds 21, 22. Then, a contraction force is applied to the core wire 16 in the horizontal direction by the molds 21, 22. Owing to this pressure, each element wire having a circular sectional shape and composing the core wire 16 is deformed to have a rectangular sectional shape. Then, the core wire 16 of the covered wire 13 having the core wire diameter R3 is compressed to be in a rectangular sectional shape and R1 in height and width. Similarly, the core wire 16 of the covered wire 14 having the core wire diameter R4 is compressed to be in a rectangular sectional shape and R1 in height and width. Incidentally, time to applying the ultrasonic energy is set up in view of time for removing an oxide layer from a surface of the core wire 16 and time for roughening the surface of the core wire 16.

Figure 2:
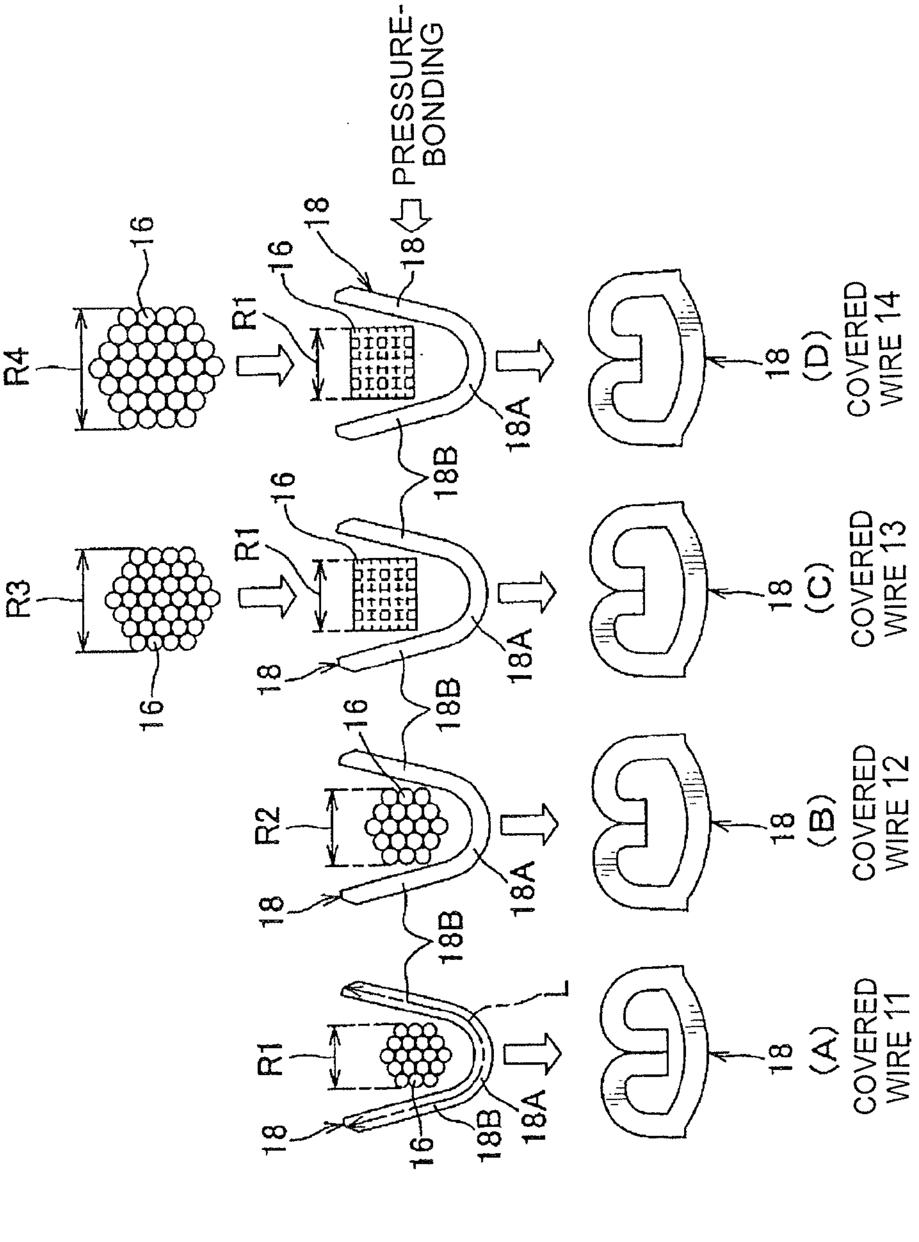
FIG. 2 is an explanatory view for explaining a wire connecting method to connect a terminal with a covered wire shown in FIG. 1.

Then, as shown in middle parts of FIGS. 2(C) and 2(D), the core wire 16 compressed in a rectangular shape R1 in height and width is mounted on the bottom wall 18A between the pair of crimping pieces 18B, and crimped by bending the pair of crimping pieces 18B inward to wrap the core wire 16. Thus, as shown in lower parts of FIGS. 2(C) and 2(D), the terminal 15 is crimped to be connected to the core wire 16. Incidentally, in the lower parts of FIG. 2 in which the wire barrel 18 is crimped, the core wire 16 is omitted.

In contrast, the ultrasonic processing is not performed to the covered wires 13, 14 having the core wire diameters R1, R2. As shown in upper parts of FIGS. 2(A) and 2(B), the covered wire 13, 14 is directly mounted on the bottom wall 18A between the pair of crimping pieces 18B, and crimped by bending the pair of crimping pieces 18B inward to wrap the core wire 16. Thus, as shown in lower parts of FIGS. 2(A) and 2(B), the covered wire 13, 14 is crimped to the wire barrel 18 of the terminal 15.

According to the above embodiment, a step to reduce the core wire diameter within the specific range able to crimp with the terminal 15 by the ultrasonic processing in which while the pressure is applied to the core wire 16 of the covered wire 13, 14, the ultrasonic energy is applied to the core wire 16, a step to mount the core wire 16 of the covered wire 13, 14 of which core wire diameter is reduced by the ultrasonic processing on the bottom wall 18A between the pair of crimping pieces 18B, and to crimp the core wire 16 to the pair of crimping pieces 18B, and a step to mount the core wire 16 of the covered wire 11, 12 on the bottom wall 18A between the pair of crimping pieces 18B without the ultrasonic processing, and to crimp the core wire 16 to the pair of crimping pieces 18B are performed. Therefore, because the core wire diameter of the core wire 16 of the covered wire 13, 14 is reduced by the ultrasonic processing, and the core wire 16 is crimped to the terminal 15, the core wire 16 of the covered wire 13, 14 of which core wire diameter R3, R4 is larger than the specific range can be connected to the terminal 15 able to crimp the core wire 16 of which core wire diameter is within the specific range. Therefore, the number of the core wire diameters able to be crimped to the one terminal 15 is increased, thereby the number of the types of the terminals 15 can be reduced, and cost can be reduced.

Incidentally, in the above embodiment, the core wire diameter is R3, R4 of the core wire 16 of the covered wire 13, 14 is reduced to R1 by the ultrasonic processing. However, the present invention is not limited to this. The core wire diameter after the ultrasonic processing may be within the specific range able to crimp with the terminal 15.

Figure 4A:
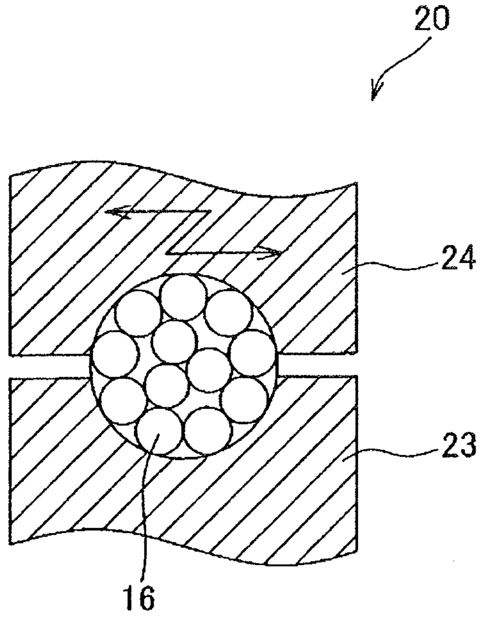
FIG. 4A is a schematic view showing another example of the ultrasonic processing device.
Figure 4B:
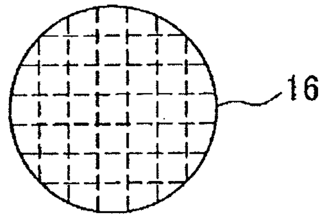
FIG. 4B is a schematic view showing the core wire after an ultrasonic processing by the ultrasonic processing device shown in FIG. 4A.
Figure 5:
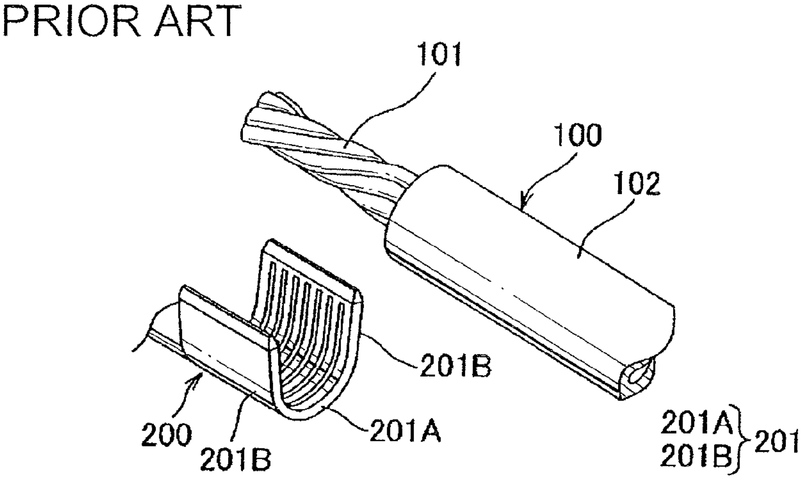
FIG. 5 PRIOR ART
FIG. 5 is an explanatory view for explaining a conventional crimping method of a terminal.
Figure 6:
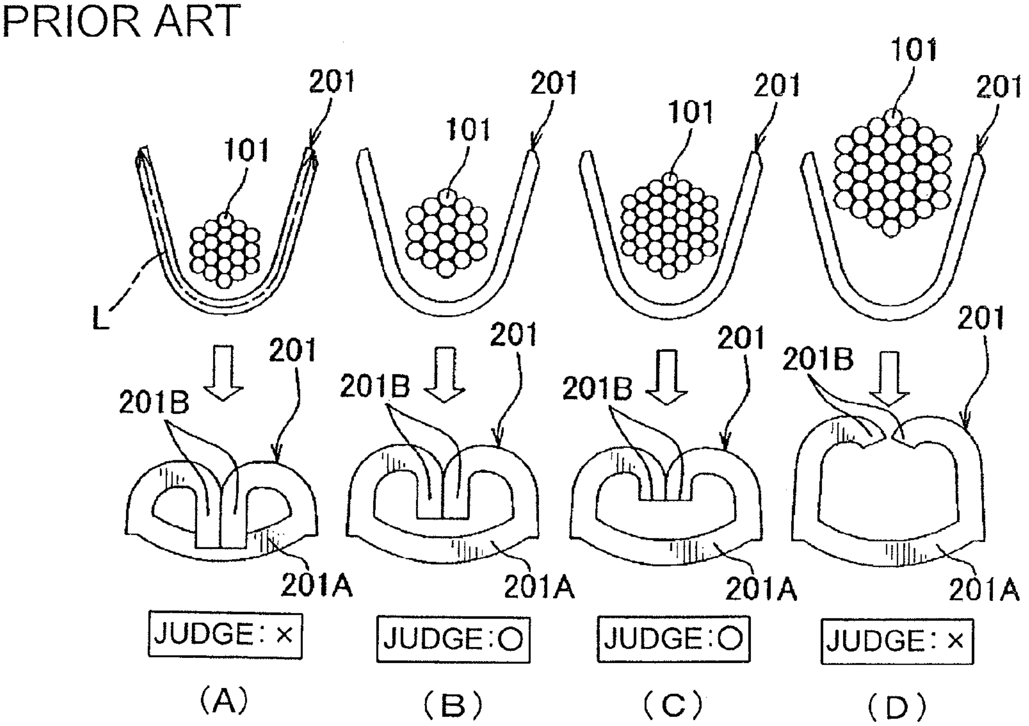
FIG. 6 PRIOR ART
FIG. 6 is an explanatory view for explaining problems of the conventional crimping method.
Figure 7:
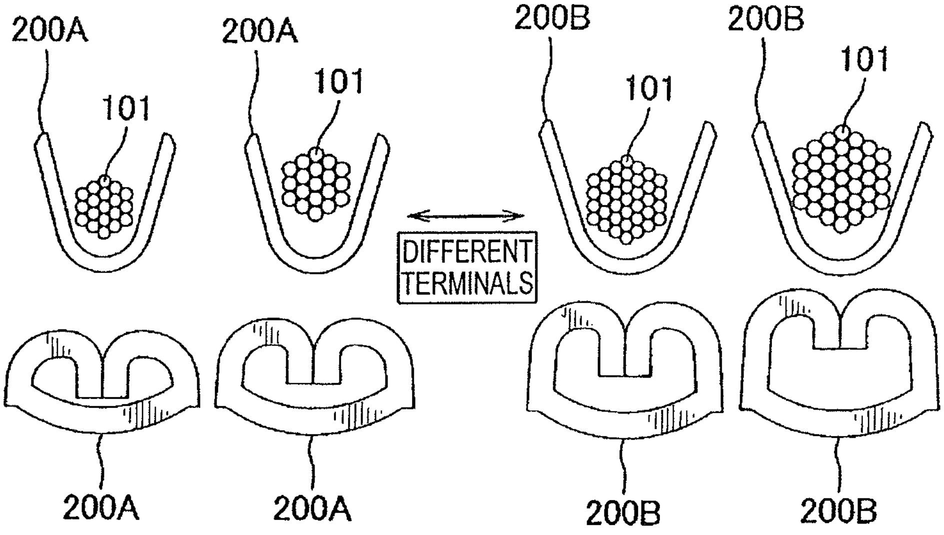
FIG. 7 PRIOR ART
FIG. 7 is an explanatory view for explaining the conventional crimping method to crimp more than one type of the covered wires having different core wire sizes with terminals.

Further, in the above embodiment, as shown in FIG. 3, the core wire 16 is formed in a rectangular sectional shape after the ultrasonic processing using the ultrasonic processing device 20 with the box-shaped molds 21, 22, the anvil 23, and the horn 24. However, the present invention is not limited to this. The core wire 16 may be in any sectional shape after the ultrasonic processing as long as the core wire 16 can be crimped to the terminal 15. For example, as shown in FIG. 4A, the core wire 16 is pinched between the anvil 23 and the horn 24 each provided with a semicircular sectional shaped groove, and while the anvil 23 is moved close to the horn 24 to apply the pressure to the core wire 16, the ultrasonic energy is applied to the core wire 16. Thereby, as shown in FIG. 4B, the core wire 16 after the ultrasonic processing may be in a circular sectional shape.

Further, in the above embodiment, the terminal 15 having the wire barrel 18 on which the core wire 16 is mounted and crimped is used. However, the present invention is not limited to this. For example, the terminal 15 may be provided with a tubular crimping portion made by connecting ends of the pair of crimping pieces 18B of the wire barrel 18 to each other. The core wire 16 exposed at the end of the covered wire 11 to 14 is inserted into the tubular crimping portion and crimped. Alternatively, the terminal 15 may be composed of the bottom wall and a pair of press-connecting blades. The core wire 16 is inserted into between the pair of press-connecting blades, and press-connected.

Further, in the above embodiment, the plurality of terminals 15 is separately provided. However, the present invention is not limited to this. For example, a joint connector terminal in which the terminals 15 are joined together may be used.

Further, the above embodiment only shows a representative example of the present invention. The present invention is not limited to the embodiment. Namely, various modifications can be practiced within a scope of the present invention.

REFERENCE SIGNS LIST

11 covered wire (first covered wire)
12 covered wire (first covered wire)
13 covered wire (second covered wire)
14 covered wire (second covered wire)
16 core wire
15 terminal
18A bottom wall
18B crimping piece (piece)

The invention claimed is:

1. A wiring harness comprising:

a first covered wire having a core wire size within a specific range;

a second covered wire having a core wire size larger than the specific range; and a plurality of terminals each composed of a bottom wall and a pair of pieces extended vertically from the bottom wall, and respectively crimped or press-connected to the first and second covered wires, wherein the sizes of the bottom wall and the pair of pieces of each terminal is able to be crimped or press-connected to the core wire within the specific range, and wherein the core wire of the second covered wire is performed an ultrasonic processing in which while a pressure is applied to the core wire, ultrasonic energy is applied to the core wire to reduce the core wire size within the specific range, and crimped or press-connected between the pair of pieces of the terminal.

2. The wiring harness as claimed in claim 1, wherein the core wire of the first covered wire is crimped or press-connected between the pair of pieces of the terminal without the ultrasonic processing.

3. A wire connecting method for crimping or press-connecting respectively a first covered wire having a core wire size within a specific range and a second covered wire having a core wire size larger than the specific range with a terminal having a bottom wall and a pair of pieces extended vertically from the bottom wall having sizes able to be crimped or press-connected to a core wire within the specific range size comprising the steps of:

performing an ultrasonic processing in which while a pressure is applied to the core wire of the second covered wire, ultrasonic energy is applied to the core wire to reduce the core wire size within the specific range; and mounting the core wire of the second covered wire of which core wire size is reduced within the specific range by the ultrasonic processing on the bottom wall between the pair of pieces of the terminal, and crimping or press-connecting the core wire between the pair of pieces.

4. The wire connecting method as claimed in claim 1, further comprising the step of:

mounting the core wire of the first covered wire on the bottom wall between the pair of pieces of the terminal without the ultrasonic processing, and crimping or press-connecting the core wire between the pair of pieces.

* * * * *